United States Patent [19]

Stolka

[11] 3,888,670

[45] June 10, 1975

[54] IMAGING METHOD

[75] Inventor: Milan Stolka, Fairport, N.Y.

[73] Assignee: Xerox Corporation, Stamford, Conn.

[22] Filed: Nov. 2, 1973

[21] Appl. No.: 412,523

[52] U.S. Cl............... 96/27 R; 96/90 R; 96/115 R; 117/1.7; 117/37 R; 204/159.14; 204/159.17
[51] Int. Cl...... B44f 1/10; G03c 11/22; G03c 5/04; G03c 1/58; G03c 1/52
[58] Field of Search............. 96/27 R, 90 R, 115 R; 204/159.14, 159.17; 260/78.4 D, 78.5 T; 117/1.7, 37

[56] References Cited
UNITED STATES PATENTS 2,772,158  11/1956  Elliott ................................. 96/27 R
2,905,554  9/1959  Fuchsman et al. .................. 96/27 R Primary Examiner—Norman G. Torchin
Assistant Examiner—J. P. Brammer
Attorney, Agent, or Firm—James J. Ralabate; James P. O'Sullivan; Jerome L. Jeffers

[57] ABSTRACT

Disclosed is an imaging method based upon the chemical intensification of a polyene image dispersed in an imagewise manner upon a substrate. The method involves contacting the film with maleic anhydride to form a reaction product between the polyene and maleic anhydride. This reaction product is then contacted with a base capable of converting the carboxylic acid anhydride group of the maleic anhyride to its corresponding salt and the so-formed salt is contacted with a solution of a dye containing a colored cation capable of replacing the cation of the salt.

15 Claims, No Drawings

IMAGING METHOD

BACKGROUND OF THE INVENTION

Imaging systems based upon the ability of polyenes having several conjugated bonds to absorb visible light are known. These systems normally operate by employing the tendency of halogenated polymers such as polyvinyl chloride and polyvinylidene chloride to dehydrohalogenate upon exposure to ultraviolet light to form the polyene. Normally a substance is added to the polymer to enhance the dehydrohalogenation reaction such as Friedel-Crafts catalyst progenitors as disclosed in U.S. Pat. Nos. 2,772,158; 2,789,052; and 2,789,053. The additives promote partial dehydrohalogenation with exposure to ultraviolet light to form sites along the polymer chain containing allylic chlorine. Additional dehydrohalogenation is then accomplished by mild heating of the film since the allylic chlorine enters into dehydrohalogenation reactions quite readily. Thus, by exposing a film of a halogen containing polymer, usually in combination with a material to enhance dehydrohalogenation, to ultraviolet light in an imagewise manner, with subsequent heating of the exposed polymer, an image is formed.

The above-described method is useful for forming images from a negative having areas transparent and opaque to ultraviolet light. It has an advantage over some other imaging systems since the gain, i.e., number of double bonds formed per photon of ultraviolet light, is greater than one. However, the image formed tends to be light brown in appearance and does not appear as distinct from the background as might be desired. In addition, at least seven conjugated double bonds must be formed per molecule in order to form an image visible in ordinary light which requires fairly extensive exposure and heating. The process would be more useful if the image formed by the dehydrohalogenation reaction could be intensified.

It is an object of the present invention to provide an imaging process based upon the intensification of an image appearing on an imaged film of a polyene containing at least two conjugated double bonds.

An additional object is to provide such a method which is based upon the ability of maleic anhydride to enter into a Diels-Alder reaction with the conjugated diene portions of the polyene and yet leave reactive sites which can be converted into a salt.

A further object is to provide such a method which intensifies the image by the reaction of a salt containing a large colored cation with the reaction product of the carboxylic acid anhydride group of maleic anhydride and a strong base.

SUMMARY OF THE INVENTION

The present invention is an imaging method based upon the intensification of an image comprising a polyene containing at least two conjugated double bonds per molecule dispersed in an imagewise manner upon a suitable substrate. The polyene is contacted with a solution of maleic anhydride to form a reaction product between the polyene and the maleic anhydride. The so-formed reaction product is then contacted with a base to convert the carboxylic acid anhydride group of the maleic anhydride to its corresponding salt and the salt is then contacted with a solution of a dye containing a colored cation capable of replacing the cation of the salt.

DETAILED DESCRIPTION

The substrate containing the polyene dispersed thereon is normally prepared by spreading a film of a solution of a halogenated polymer such as polyvinyl chloride or its copolymer with vinylidene chloride on a suitable substrate and evaporating the solvent. The solution will normally contain an additive to enhance dehydrohalogenation such as the Friedel-Crafts type catalyst progenitor previously described. Alternatively, the film may contain a photosensitizer such as benzophenone or a strong organic electron acceptor such as tetracyanoethylene to enhance dehydrohalogenation. Substrates upon which the film is cast include those materials which will support the film. Preferably, non-porous substrates such as mylar, glass, metal or coated paper are used. After casting, the film is exposed to ultraviolet light in an imagewise manner to promote dehydrohalogenation with the subsequent formation of double bonds along the polymer backbone. Additional double bond formation may be caused by heating of the exposed film. Normally, heating temperatures of from room temperature to 150°C. will be adequate to cause sufficient dehydrohalogenation. Heating is optional in the instant process since two conjugated double bonds are sufficient to form a latent image which can be converted to a visible image by the process of the present invention.

After the film is imaged, the substrate has dispersed on its surface in an imagewise configuration a polyene containing at least two conjugated double bonds per molecule. This is the case since double bond formation will occur only in the exposed areas.

The film is now ready for treatment with maleic anhydride. This is accomplished by contacting it, such as by dipping or spraying, with a solution of maleic anhydride in a suitable solvent. Suitable solvents for maleic anhydride are those which will dissolve the maleic anhydride but do not dissolve the exposed film. In general, organic solvents such as benzene, toluene, acetone, diethyl ether, chloroform, methylene chloride and ethyl acetate may be used.

Upon contact of the film and maleic anhydride solution, a reaction product forms due to the occurrence of a Diels-Alder reaction between two conjugated double bonds of the polyene and the maleic anhydride. While partial reaction will take place almost instantaneously, a contact period of at least about 10 seconds and preferably from ½ to 5 minutes is normally employed to ensure substantially complete reaction. The requisite contact time will vary inversely with the concentration of maleic anhydride in solution and with temperature. The film may then be washed with additional solvent to remove unreacted maleic anhydride and to prepare it for the next step.

At this point, the film is contacted with an aqueous base which will hydrolyze the carboxylic acid anhydride group and form a salt with the reaction product of the hydrolysis. Solutions of bases which can be employed include the soluble hydroxides of the alkali and alkaline earth metals, such as NaOH, KOH, LiOH, Ca(OH)$_2$ and Mg(OH)$_2$. Preferably, the film is contacted with vapors of aqueous ammonia to thereby convert the carboxylic acid anhydride group to the corresponding ammonium salt.

The film is next contacted with a solution of a dye having a colored cation capable of replacing the cation of the salt formed in the previous step. Suitable dyes include azo dyes such as Janus Green B(MLB), Chrysoidine and Janus yellow G; triarylmethane dyes such as Malachite Green, Fuchsine, Crystal Violet and Ethyl Violet; xanthene dyes such as Acridine Red 3B, Saccharein and Rhodamine 12 GM; acridine dyes such as Acriflavine (By), Acridine yellow G and T and Basic Dye; quinoline dyes such as Quinoline Red (A); methine, polymethine dyes such as C.I. Basic Violet 7 and Astra Violet FN extra (IG); thiazole dyes such as C.I. Pigments yellow 18; indamine, indophenol dyes such as Phenylene Blue and Toluylene Blue; azine dyes such as Neutral Violet (DH) (C), Neutral Blue (MLY) (C), C.I. Basic Violet 12, Napthyl Red, Naphthyl Violet and Naphthyl Blue; oxazine dyes such as C.I. Mordant Violet 35, C.I. Mordant Blue 14, C.I. Basic Blue 10 and New Methylene Blue GG; and thiazine dyes such as Lauth's Violet and Methylene Green.

These dyes are applied from solvents in which they are soluble but which will not dissolve away the film. Typically, organic solvents, such as methanol, benzene and ethyl acetate, may be used. Some cation replacement will take place almost immediately, but for maximum conversion a period similar to that of the contact between the polyene film and the maleic anhydride is employed.

The above procedure provides an imaged film having significantly enhanced contrast as compared to the image obtained by exposure of a halogenated polymer to ultraviolet light. This is the case even when materials are added to the polymer to enhance its dehydrohalogenation and the film is heated after exposure. Furthermore, the present invention produces a visible image from a polymer containing only one pair of conjugated double bonds per molecule whereas the process which relies solely upon dehydrohalogenation requires the formation of at least seven conjugated double bonds.

While the present invention is not predicated mechanism, the theory by which it operates, the following mechanicsm, in which the polymer is partially dehydrohalogenated polyvinyl chloride, the base is ammonia, and the dye is Methylene Blue, is believed to account for image intensification.

1. The conjugated parts of the polyene structure enter into a Diels-Alder reaction with maleic anhydride as illustrated by the equation in which the brackets segregate a pair of conjugated double bonds.

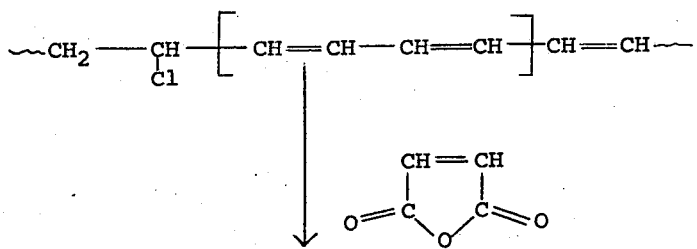

2. The carboxylic acid anhydride group is converted to the ammonium salt by exposure to aqueous ammonia.

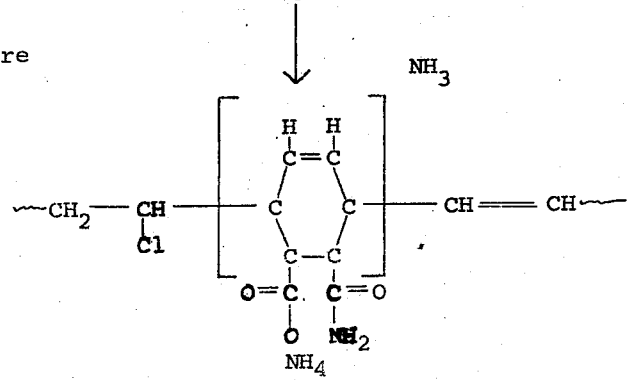

3. The ammonium cation is replaced by a large colored cation from Methylene Blue.

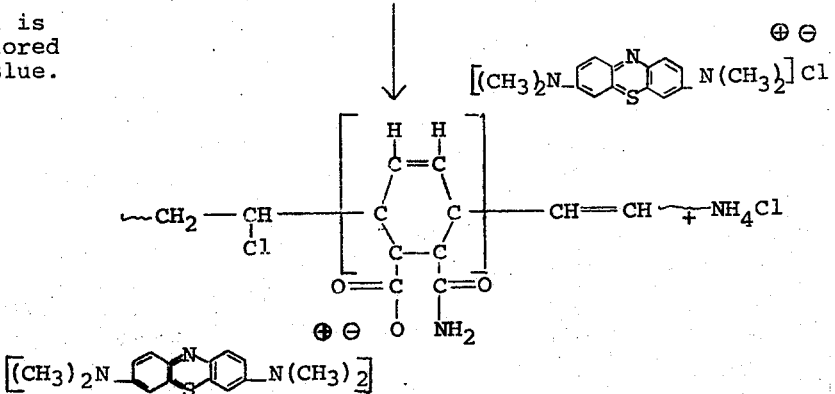

Ideally, the dye will adhere only to that part of the polymer containing conjugated double bonds, i.e., the imaged portion. In practice, the dye may cause the background to become slightly colored. When this happens, careful rinsing of the imaged plate with a solvent such as those previously described will increase image contrast.

The method of carrying out the process of the instant invention is further illustrated by the following example.

EXAMPLE I

A sandblasted aluminum foil substrate is coated with a film of polyvinyl chloride containing approximately 1 percent by weight of tetracyanoethylene (TCNE) by applying a solution of the polymer and TCNE in tetrahydrofuran to the substrate and evaporating the solvent to form a photographic plate.

The film is exposed through a simple negative to UV light from a Mineral Light produced by Ultraviolet Products, Inc., San Gabriel, Calif., for 10 minutes and heat developed at about 70°C. for 10 minutes.

The plate, which bears a brown image in the exposed areas, is then dipped into a warm solution of 5 percent by weight maleic anhydride in benzene for several seconds. Next, the plate is washed with acetone, exposed to aqueous ammonia vapors and immersed in a 2 percent by weight solution of Methylene Blue in methanol. The image on the plate is intensified by the formation of a deep blue color in the image bearing areas.

What is claimed is:

1. An imaging method which comprises:
   a. contacting a substrate having dispersed on its surface in an imagewise configuration a film of a polyene having at least two conjugated double bonds per molecule with a solution of maleic anhydride to form a reaction product between the polyene and maleic anhydride;
   b. contacting the reaction product with a base to convert the carboxylic acid anhydride group of the maleic anhydride to its corresponding salt, and
   c. contacting the salt with a solution of a dye containing a colored cation capable of replacing the cation of said salt.

2. The method of claim 1 wherein the maleic anhydride is dissolved in a non-polar organic solvent.
3. The method of claim 1 wherein the polyene film is contacted with the maleic anhydride solution for a period of at least about 10 seconds.
4. The method of claim 3 wherein the period is from ½ to 5 minutes.
5. The method of claim 1 wherein the base is selected from the group of soluble hydroxides of the alkali or alkaline earth metals or aqueous ammonia.
6. The method of claim 1 wherein the dye is dissolved in an organic solvent which will not dissolve the film.
7. The method of claim 1 wherein the dye is Methylene Blue.
8. The method of claim 1 wherein the salt and dye solution are contacted for a period of at least 10 seconds.
9. The method of claim 8 wherein the period is from ½ to 5 minutes.
10. A method of imaging which comprises:
    a. exposing to ultraviolet light in an imagewise manner a film of a halogen containing polymer to thereby dehydrohalogenate the polymer and form conjugated double bonds along its backbone;
    b. contacting the exposed film with a solution of maleic anhydride to form a reaction product between the polymer and maleic anhydride;
    c. contacting said reaction product with a base to convert the carboxylic acid anhydride group of the maleic anhydride to its corresponding salt; and
    d. contacting said salt with a solution of a dye containing a colored cation capable of replacing the cation of the salt.
11. The method of claim 10 wherein the polymer is polyvinyl chloride.
12. The method of claim 10 wherein the halogen containing polymer is mixed with a strong organic electron acceptor.
13. The method of claim 12 wherein the electron acceptor is tetracyanoethylene.
14. The method of claim 10 wherein the film is heated after exposure.
15. The method of claim 10 wherein the dye is Methylene Blue.

* * * * *